(12) United States Patent
Anderson et al.

(10) Patent No.: US 6,559,849 B1
(45) Date of Patent: May 6, 2003

(54) ANIMATION OF LINEAR ITEMS

(75) Inventors: John R Anderson, San Anselmo, CA (US); Hiromi Ono, Corte Madera, CA (US)

(73) Assignee: Lucas Digital Ltd., San Rafael, CA (US)

( * ) Notice: Subject to any disclaimer, the term of this patent is extended or adjusted under 35 U.S.C. 154(b) by 168 days.

(21) Appl. No.: 09/629,076

(22) Filed: Jul. 31, 2000

Related U.S. Application Data

(60) Provisional application No. 60/146,504, filed on Jul. 30, 1999.

(51) Int. Cl.[7] .......................... G06T 13/00; G06T 15/70
(52) U.S. Cl. ..................................... 345/474
(58) Field of Search .................... 345/474, 473, 345/475

(56) References Cited

U.S. PATENT DOCUMENTS 6,300,960 B1 * 9/2001 DeRose et al. ............. 345/474

OTHER PUBLICATIONS

Bill Flemiing, How To Be Furrific!, May 1998, Animation World Magazine, pp. 1–5, http://www.awn.com/mag/issue3.2/3.2pages/3.2flemingfur.html.*
Rick Parent, Model–Based Animation, 1998 pp. 1–22, http://www.cis.ohio–state.edu/~parent/book/Modl.html.*
Park et al., Computer Facial Animation, 1966, A K Peters, Ltd., pp. 316–328.*

* cited by examiner

*Primary Examiner*—Mark Zimmerman
*Assistant Examiner*—Linzy McCartney
(74) *Attorney, Agent, or Firm*—Irell & Manella LLP

(57) ABSTRACT

The present invention presents techniques for simulating and generating lifelike digital representations of scenes that may include one or more dynamic linear objects such as rope, antennae, hair, feathers, fur and grasses. Individualized geometric models may be defined for a selected, manageable subset of the linear objects. By interpolating and animating based upon these defined geometric models, subject to user-specified object parameters, a dynamic simulation and a static geometry may subsequently be generated. Rendering techniques according to the present invention may be used to generate two-dimensional image projections of these geometries, as seen from a specified point of view. These steps of geometric interpolation and rendering are performed in an iterative manner, such that numerous fine-grained objects may be processed and rendered portion by portion, thereby greatly reducing the computational complexity of the task. Other aspects of the invention include the use of depth information regarding individual hairs for purposes of performing accurate rendering. Selected portions of depth and velocity information are also retained and utilized in order to composite and motion blur, in a reasonably accurate manner, the rendered hair image projections together with other three-dimensional scene elements.

1 Claim, 8 Drawing Sheets

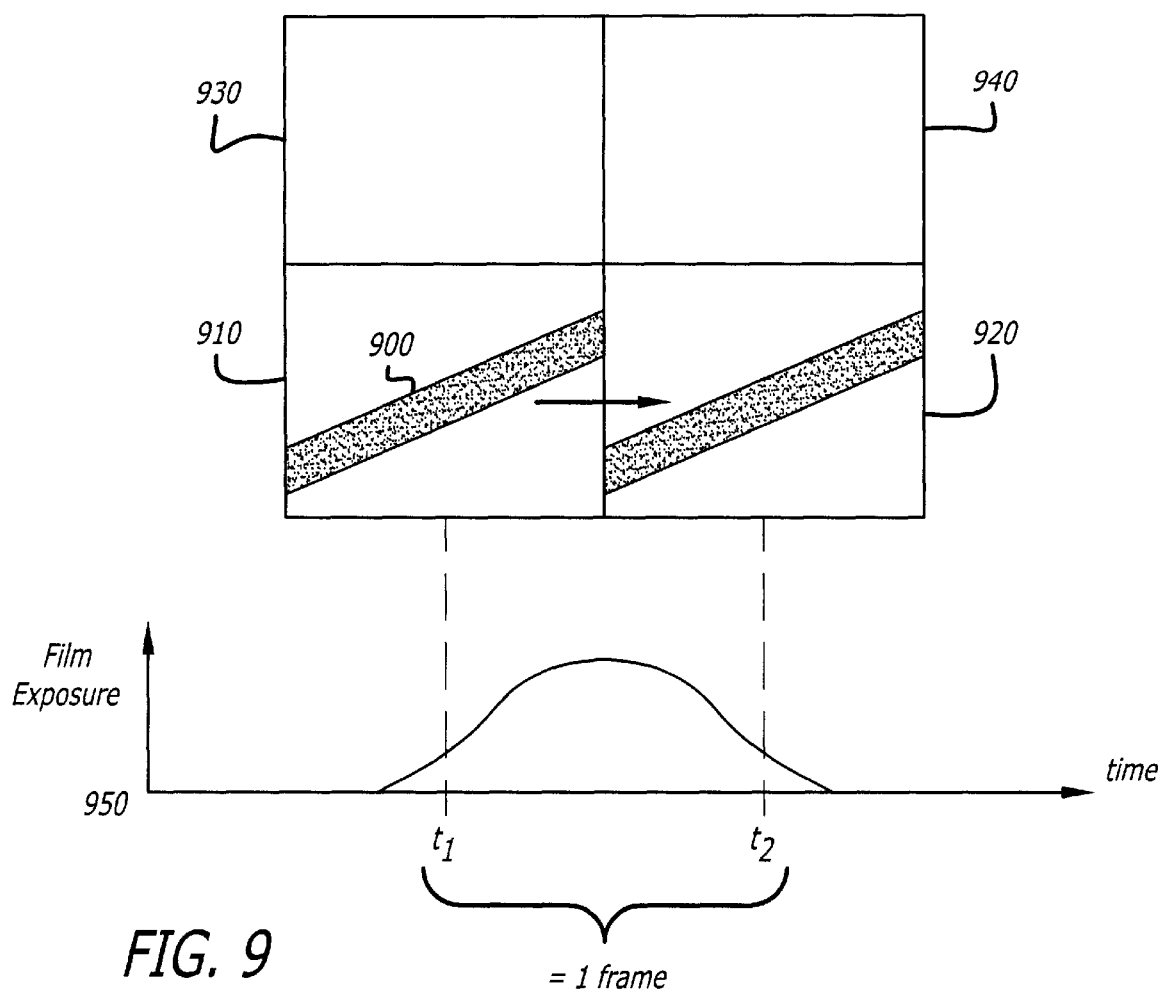
FIG. 9
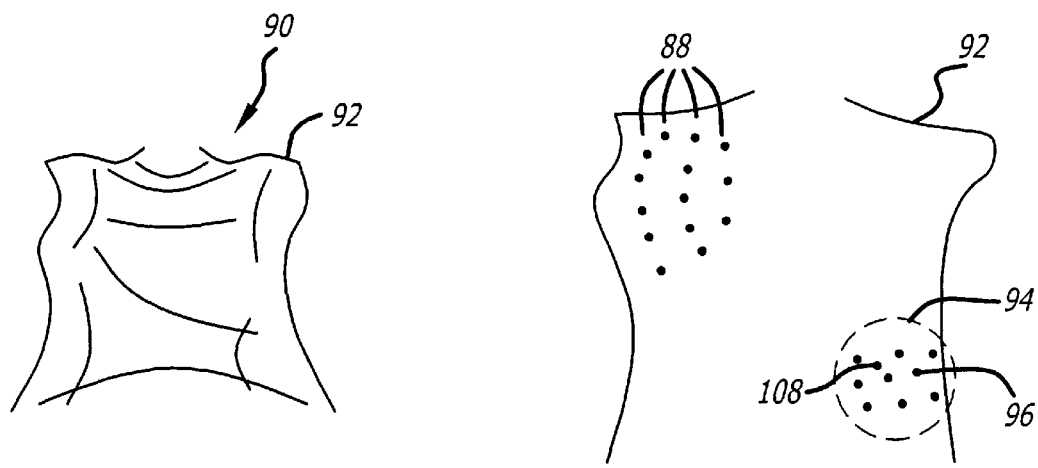
FIG. 10a
FIG. 10b

ANIMATION OF LINEAR ITEMS

RELATED APPLICATION

This application claims priority of Provisional application Ser. No. 60/146,504 filed Jul. 30, 1999.

BACKGROUND OF THE INVENTION

1. Field of the Invention

This invention relates to computer animation techniques and more specifically to improved techniques for the generation and animation of linear items such as hair, fur, grass, rope and antennae.

2. Description of the Prior Art

Creating lifelike digital representations of creatures with hair poses difficult problems in the field of computer graphics. (Herein, we use the term "hair" broadly, so as to encompass hair, fur, and the like.) Achieving a high degree of visual realism demands that the computer-generated image reflect lifelike dynamics, deviations and imperfections with respect to characteristics including shape, texture, color, lighting, separation, movement and curvature, all at the granular level of individual hairs. However, because a typical image literally involves millions of individual hairs, it has in the past seemed impractical from a computational standpoint to apply this degree of high fidelity computer graphics modeling to hair. Conventional solutions are generally unsatisfactory for important applications where high fidelity is critical, such as providing computer graphics special effects for motion pictures.

Another related challenge is the need to integrate hair elements with other scene elements in a consistent manner. For example, hair elements created through the use of computer graphics techniques should exhibit characteristics such as motion blur and shadowing to the same extent that other objects in the scene do. Otherwise, image realism can be compromised.

The failure of prior art techniques to take individual hair characteristics into account, and to integrate hair properly with other scene elements, has typically resulted in special effects which are all too obvious to motion picture viewers, and therefore unconvincing.

What is needed is a technique for modeling, animating and rendering hair images in a manner that is both highly realistic as well as computationally practical. Such a methodology could prove equally valuable in analogous computer graphics applications, wherever it is desired to represent images made up of a relatively high density of individual image elements having both common and independent image characteristics.

Computer modeling the motion of flexible linear items such as rope, cable, antennae and the like can be a very complex problem. For many applications such as computer animation, a simple dynamic model is used to model the physics of motion and the dynamic model is then used to render a final image having all the desired complexity of a real surface. Conventional computer animation techniques have two approaches. In the first, highly accurate dynamic models are used that require vast computer processing capacity and yield fairly realistic results. In the second conventional technique, simplistic two-dimensional models are used that have modest computer processing needs and yield imprecise results.

The simplistic conventional dynamic modeling techniques have difficulty representing linear flexible items whose dynamics are strongly influenced by their three dimensional nature.

What is needed is a computationally efficient dynamic model for representing flexible linear items.

SUMMARY OF THE INVENTION

The present invention provides a technique for creating lifelike digital representations of three-dimensional scenes that include numerous fine-grained objects such as hair, feathers, fur and grasses. Steps and means are described by which individualized geometric models are defined for a selected, manageable subset of the fine-grained objects. Using interpolation based upon these defined geometric models, geometries are subsequently generated for the full set of fine-grained objects. Rendering techniques are then used to generate two-dimensional image projections of these geometries, as seen from a specified point of view. These steps of geometric interpolation and rendering may be performed in an iterative manner, such that the numerous fine-grained objects are processed and rendered portion by portion, thereby greatly reducing the computational complexity of the task.

Other aspects of the invention include the use of depth information regarding individual hairs for purposes of performing accurate rendering. Selected portions of depth information are also retained and utilized in order to composite, in a reasonably accurate manner, the rendered hair image projections together with other three-dimensional scene elements. A further feature of the invention allows users to texture map hair parameters such as hair color, density, and light reflecting properties over the surface containing the hair. These hair parameters allow the user additional control over the process of hair generation and rendering described above.

In another aspect, the present invention provides a hair damping formulation based on two terms, one of these provides distribution of momentum along the hair during the integration and is equivalent to a traditional bending association. The other term, the "hair body", is a drag term which is generally small and provides a velocity drag to the velocity of the non-simulated, enveloped, position of the hair. The key element of these two formulations is that when used together they provide the appearance of hair to hair coupling without the significant computational expenses associated with true hair to hair coupling.

In still another aspect, the present invention includes two restoring forces implemented in a simulation of flexible linear items. The first of these forces is a spring based stretching force that acts only in the direction of segments of the linear item or items and is equivalent to tensile stiffness in cloth simulations. The second force is a target based stiffness which combines conventional bending stiffness elements. The target position for this force is determined by taking the enveloped orientation and length of a segment of a linear item and rotating it by an angle needed to rotate the segment of a linear item one closer to the orientation of a base or root end of the linear item from its enveloped orientation to its current orientation. This rotated segment is then used as a position vector starting from the current position of the base of the segment to provide an anchor position for a spring that combines bending and tensile stiffness.

When used together these two formulations can achieve a wide range of physical properties. For example a stretchy, bouncy look can be achieved with a negative tensile stiffness offsetting a larger target stiffness, and limp, rope like behavior can be achieved with large tensile stiffness and small target stiffness.

These and other features and advantages of this invention will become further apparent from the detailed description and accompanying figures that follow. In the figures and description, numerals indicate the various features of the invention, like numerals referring to like features throughout both the drawings and the description.

BRIEF DESCRIPTION OF THE DRAWINGS

FIG. 9 is a frame and graph illustration of the phenomenon of motion blur.

FIGS. 10A and 10B are drawings showing a texture map and related control hairs for a surface.

DETAILED DESCRIPTION OF THE PREFERRED EMBODIMENT(S)

Figure 1:
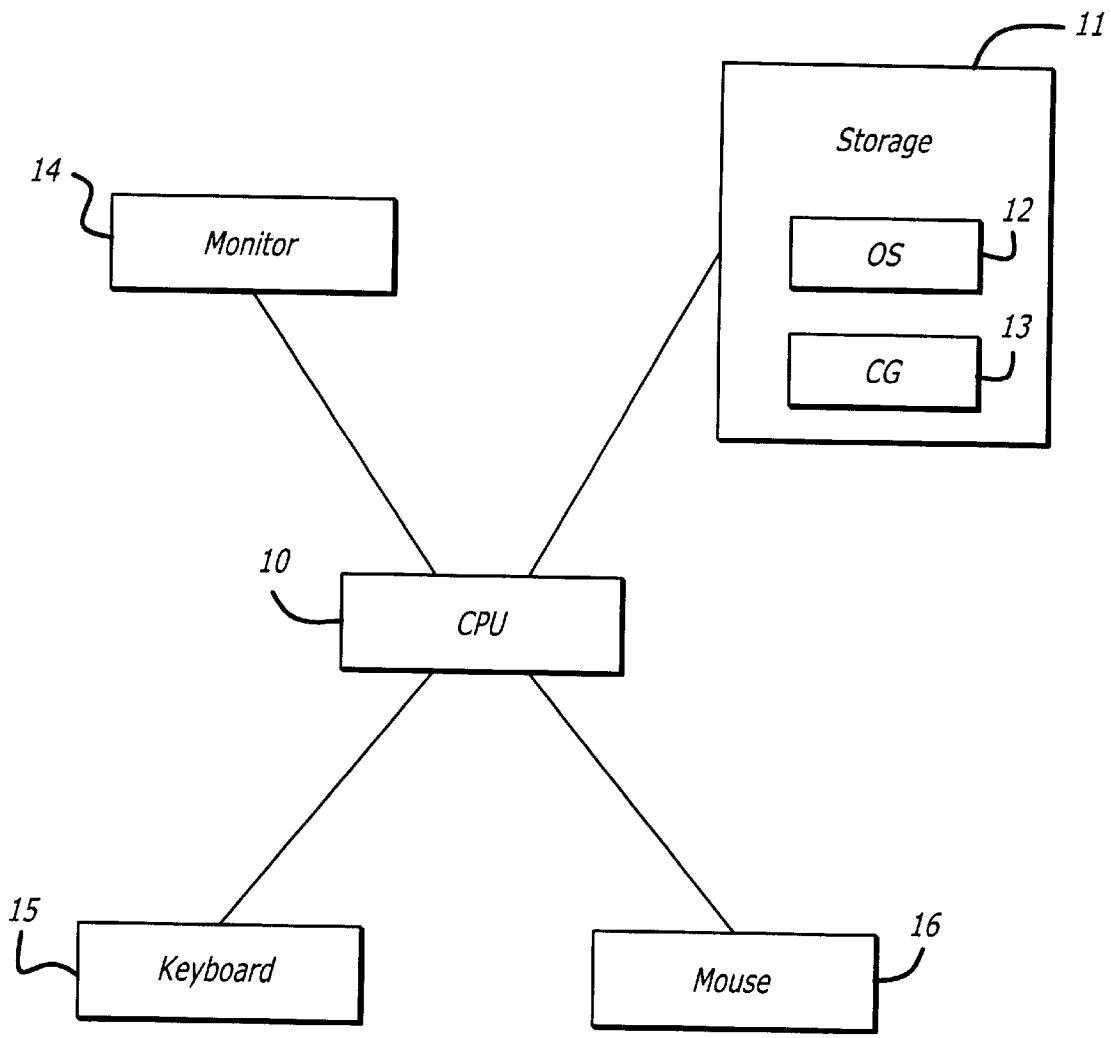
FIG. 1 is a block diagram of a computer apparatus for implementing the present invention.

Referring to FIG. 1, a block diagram of a digital computer system for implementing the present invention is presented. Processor 10 is a conventional digital computer processor, preferably a workstation-class processor such as SILICON-GRAPHICS INDIGO2-EXTREME for interactive work, or SILICON-GRAPHICS CHALLENGE SERVERS FOR BATCH PROCESSING, running preferably the IRIX5.3 operating system. Although the processor 100 is shown as one unit, it will be appreciated that separate processes may be employed for interactive use and batch processing. System software 12 is stored on storage unit 11, e.g., a standard internal fixed disk drive. Also preferably stored on storage unit 11 is computer graphics ("CG") software 13 which, in accordance with the present invention, performs the tasks of modeling, texture mapping, generating, interpolating, animating, rendering, and compositing, as described in greater detail below. Interactive user input, where referenced below, is provided via standard input peripherals such as keyboard 15 and/or mouse 16. Graphical output created by processor 10 under control of CG software 13 is transmitted to video monitor 14 for display to users; equivalently, output may also be transmitted to a printing devices to generate hard copy output in the form of videotape, film, slides, or the like.

Figure 2:
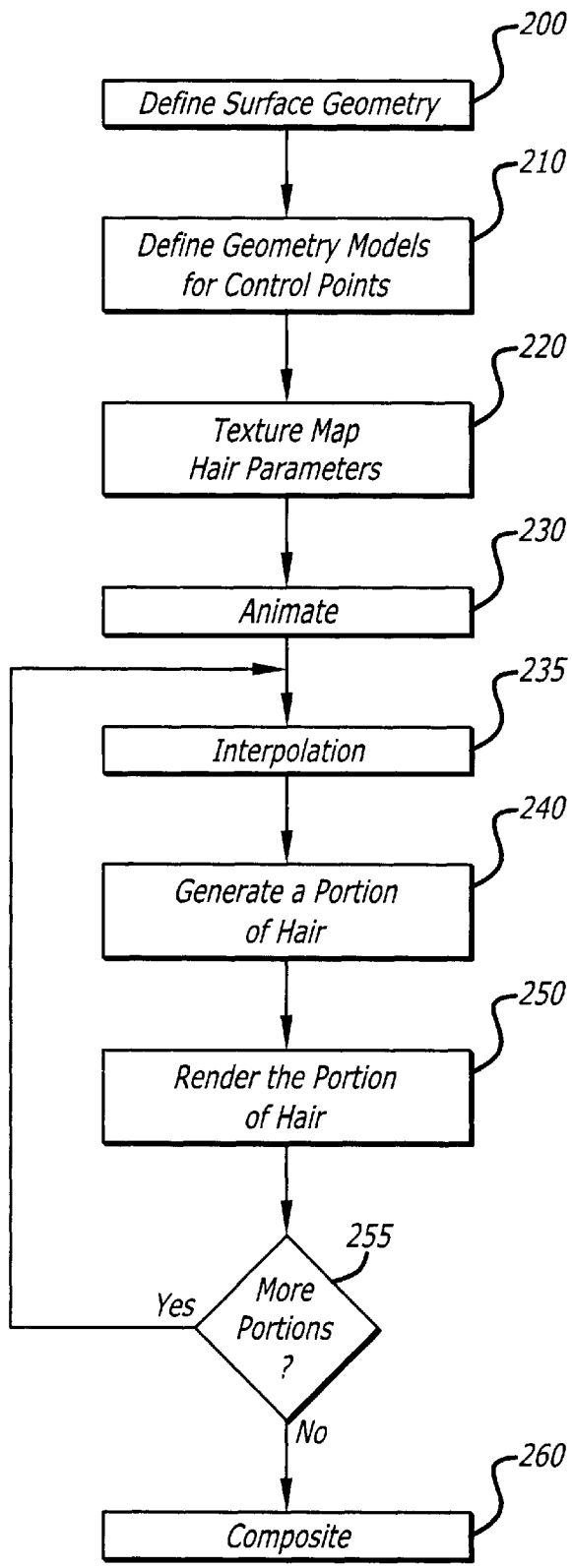
FIG. 2 is a flow diagram illustrating a preferred methodology in accordance with the present invention.

FIG. 2 is a flow diagram depicting a preferred methodology in accordance with the present invention. At step 200, the user defines a three-dimensional geometry for the skin or similar surface of the creature upon which hair is to be placed. At step 210, the user specifies a three-dimensional, geometric model for the actual hair. As will be described in greater detail below, the user need not specify explicit, separate geometries for each individual hair object, nor is the user restricted to defining a single, invariant geometry for the hair as a whole. Instead, in accordance with the present invention, the user specifies explicit geometries for a selected subset of individual hairs, which we refer to herein as "control hairs." This control hair information is used subsequently, as will be described below, to generate or "grow" a full head or body of hair automatically.

At step 220, the user creates texture maps specifying various hair parameters to control the subsequent generation of hair. These parameters may include, for example, density, color, light reflecting properties, individual hair thickness, and geometric perturbations. Texture maps are used in this step, so that these parameters can vary over the surface of the creature in a manner that is both natural and convenient. Commercially available programs can be used to assist an animator in creating a texture map, or else those of skill in the art may create custom tools of similar nature to suit the needs of particular applications and computational environments.

At step 230, the geometry and hair parameter information specified during steps 210 and 220 is animated over time. Preferably, this is accomplished by performing steps 210 and 220 with respect to a plurality of key frames, and then using conventional interpolation techniques to animate the transitions between key frames. In principle, any or all of the hair parameters specified during step 220 can be animated over time, but those of skill in the art will appreciate that some hair parameters are by nature invariant with respect to time, and should not be animated for certain images. For example, in natural animals, hair density may vary with respect to position on the animal's body, but typically does not vary with respect to time.

At step 235, hair geometry interpolation techniques are used to generate or "grow" for each frame a full head or body of hair, based on the control hair information specified at step 210 and the texture map hair parameters specified at step 220. At step 240, a generation step is performed in which various characteristics for all or part of the full head or body of hair may be changed. For example, it may be desirable to make a subset of the hair more curly. A texture map may be drawn to indicate the desired curliness for a patch of hair, and the generation step transforms the hair according to the texture map. As will be appreciated, the generation step 240 may involve the transformation of any type of hair characteristic in any manner. Further, the generation step may utilize other inputs, such as a random or constant value, apart from a texture map to indicate how the hairs should change according to the desired characteristic.

Interpolation step 235 and generation step 240 are closely coupled with rendering step 250, which involves projecting the three-dimensional information regarding the hair objects onto a two-dimensional bit map of finite resolution. In order to achieve realistic modeling of hair in a computationally practical manner, the steps of interpolation, generation and rendering are tightly coupled, so that the creatures hair is essentially interpolated, generated and then rendered piece by piece. As will be described in greater detail below, this enables a system in accordance with the present invention to maintain focus on a limited, tractable amount of information in detail at any one moment when dealing with a particular portion of hair, and to thereafter discard most of this detail when moving on to generate and render additional portions of hair.

Finally, at step 260, the fully rendered hair is composited with other elements of the scene being represented. During this step, various interactions and relationships among the different scene objects are preferably taken into account, as discussed below.

Two separate layers of hair, such as two different types of hair textures, may be created by performing steps 200–255 separately for each layer and then performing the compositing step 260.

Having thus far provided an overview of a basic methodology in accordance with the present invention, we will now discuss in greater detail those elements and aspects of the method that warrant further attention.

Geometric Modeling of Control Hairs

Figure 3A:
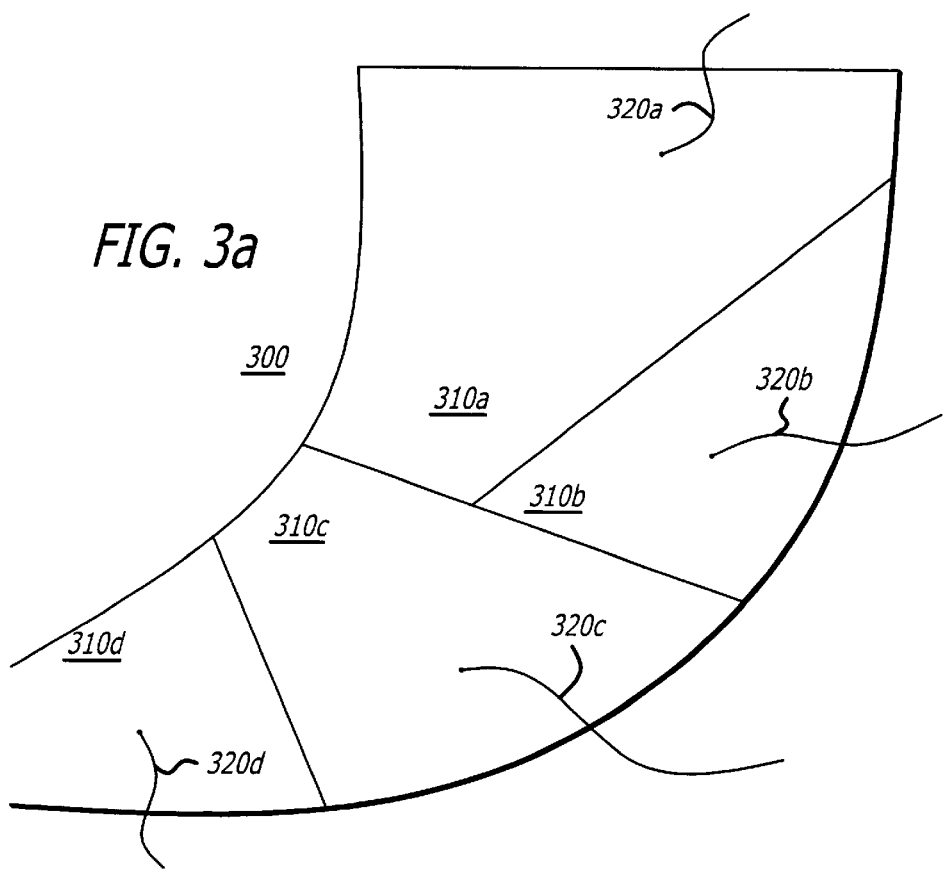
FIG. 3A is a diagram of an area subject to the modeling technique utilizing control hairs.

FIG. 3*a* illustrates a technique by which users define hair geometries at step 210. As noted briefly above, users need not explicitly specify separate geometries for each individual hair object, nor are users restricted to choosing a single, invariant geometry for all hairs. Instead, users can define individual geometries for a user-selected subset of individual hairs, shown in FIG. 3*a* as control hairs 320*a*, 320*b*, 320*c*, and 320*d*. Surface 300 represents a portion of body surface or skin on which the hairs are located. During the subsequent hair generating step 230, geometries are automatically defined for the numerous intervening positions on surface 300, by mathematically interpolating between the geometry definitions for the various control hairs 320*a–n*. In the presently preferred embodiment, scattered data interpolation is employed to interpolate the control hairs 320*a–n*. (Hair density is typically determined and controlled by hair parameters specified during step 220, as discussed elsewhere herein.) In practice, some portions of hair on a particular individual's body may warrant finer degrees of control than others. Therefore, preferably, the number and spacing of control hairs within surface 300 are specified by the user.

Figure 3B:
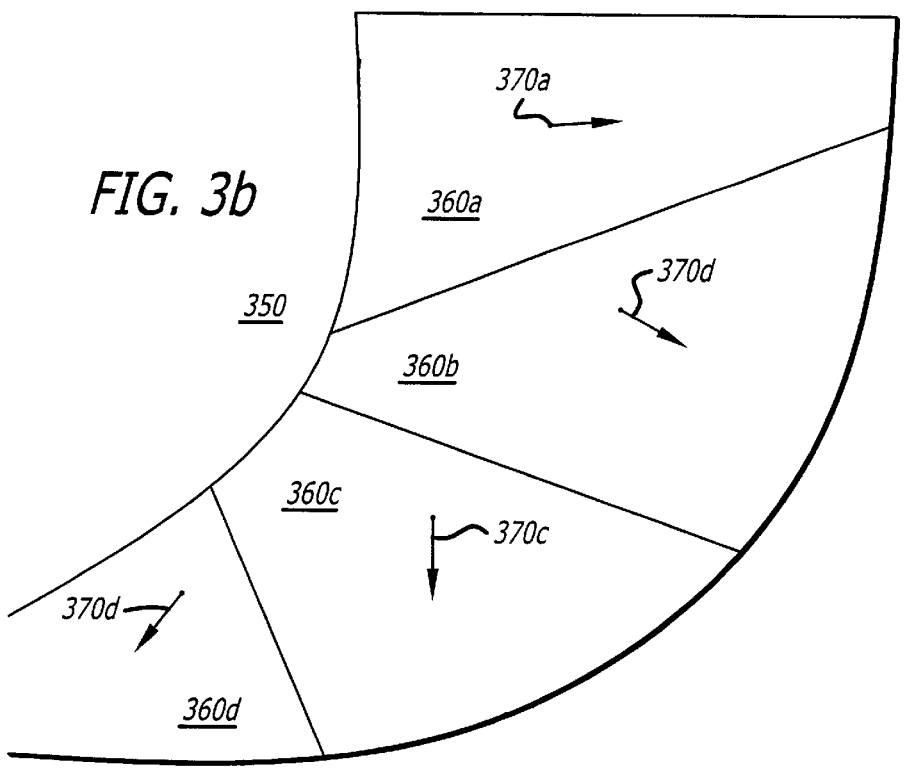
FIG. 3B is a diagram of an area subject to the modeling technique utilizing control directions.

FIG. 3*b* illustrates the use of a somewhat similar technique that is particularly well-suited to defining geometric models for very short hair. In that case, as shown in FIG. 3*b*, "control directions" 370*a*, 370*b*, 370*c*, and 370*d* are defined by the user to specify the direction that the hair lies at various positions within surface 350. Once again, generating step 230 uses mathematical interpolation (again, subject to the hair parameters of step 220) to derive hair directions for intervening points on surface 350. This technique is suitable for very short hair, because very short hairs do not have intricate geometries, and it is typically sufficient, for practical purposes, to specify and vary only the directions along which such hair lies.

Generation of Hair

Figure 4:
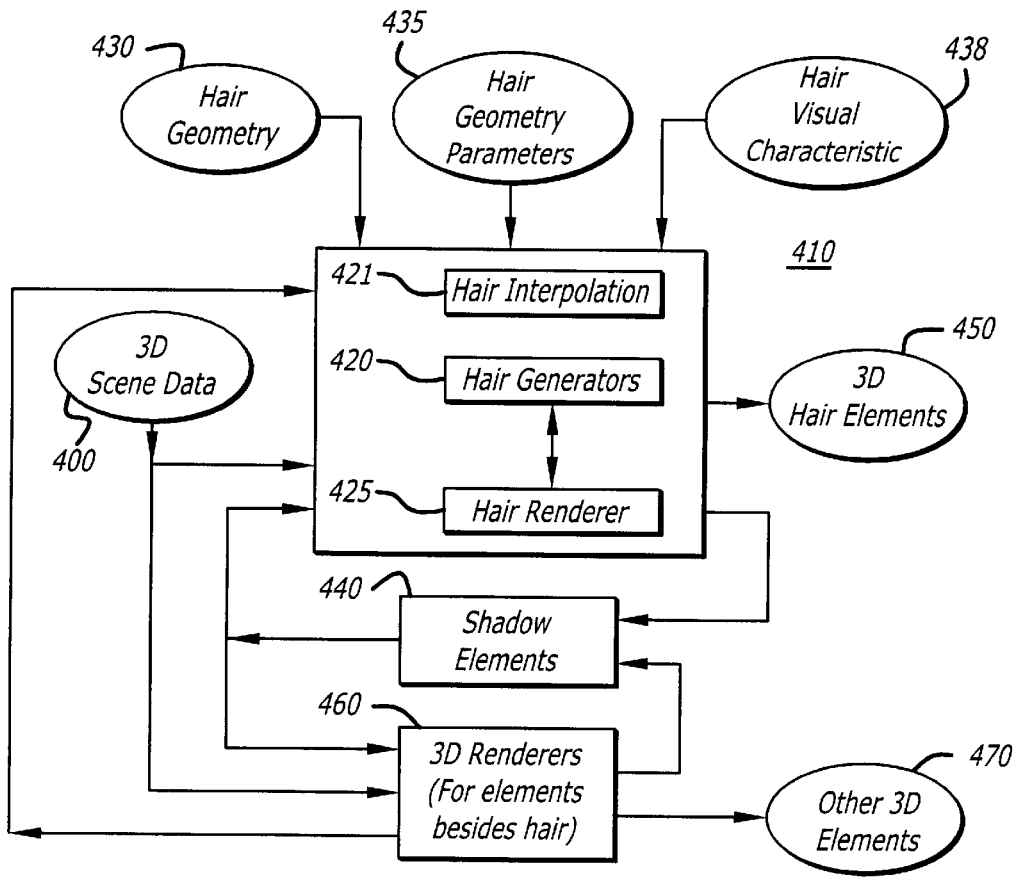
FIG. 4 is a block diagram representing a preferred information flow for the present invention.

FIG. 4 is a block diagram representing a preferred information flow in accordance with the present invention. Note that in this diagram, data inputs and outputs are generally depicted with circles, while processing steps or tasks or depicted with rectangles. As shown in FIG. 4, three-dimensional data 400 describing the scene that is to be graphically represented by the computer system of FIG. 1 is initially input into the system. Data 400 includes three-dimensional geometric descriptions of scene elements, such as surface 300 of FIG. 3*a*, and all other pertinent scene information such as the location and orientation of a lighting source, and the point of view from which the scene is being viewed.

Software module 410, a component of CG software 130, includes generator software 420 for performing hair generation step 240, hair interpolation software 421 for performing interpolation step 235, and rendering software 425 for performing hair rendering step 425. Hair interpolation software 421 receives several categories of input data: hair geometry data 430, which comprises the control information discussed above in connection with FIGS. 3*a* and 3*b*; generator attribute data 435, as discussed earlier in connection with texture mapping step 220; and 3D scene data 400, which includes data that describes the geometry of surface 300 or any other surface upon which hair is to be generated. Using interpolation techniques on geometry data 430, as controlled by generator attribute data 435 (e.g., a hair density parameter) and 3D scene data 400 (e.g., the geometry of surface 300), individual geometries are then generated automatically at step 240 for the large number of hairs covering surface 300.

Generator software 420 receives the interpolated hair information from the hair interpolation software 421. Generator software 420 also receives 3D scene data 400 and characteristics 438, which may comprise any visual trait such as color or shininess. With all of this information, generator software 420 performs generation step 240 which results in the desired patch of hair.

Rendering Details

Figure 5:
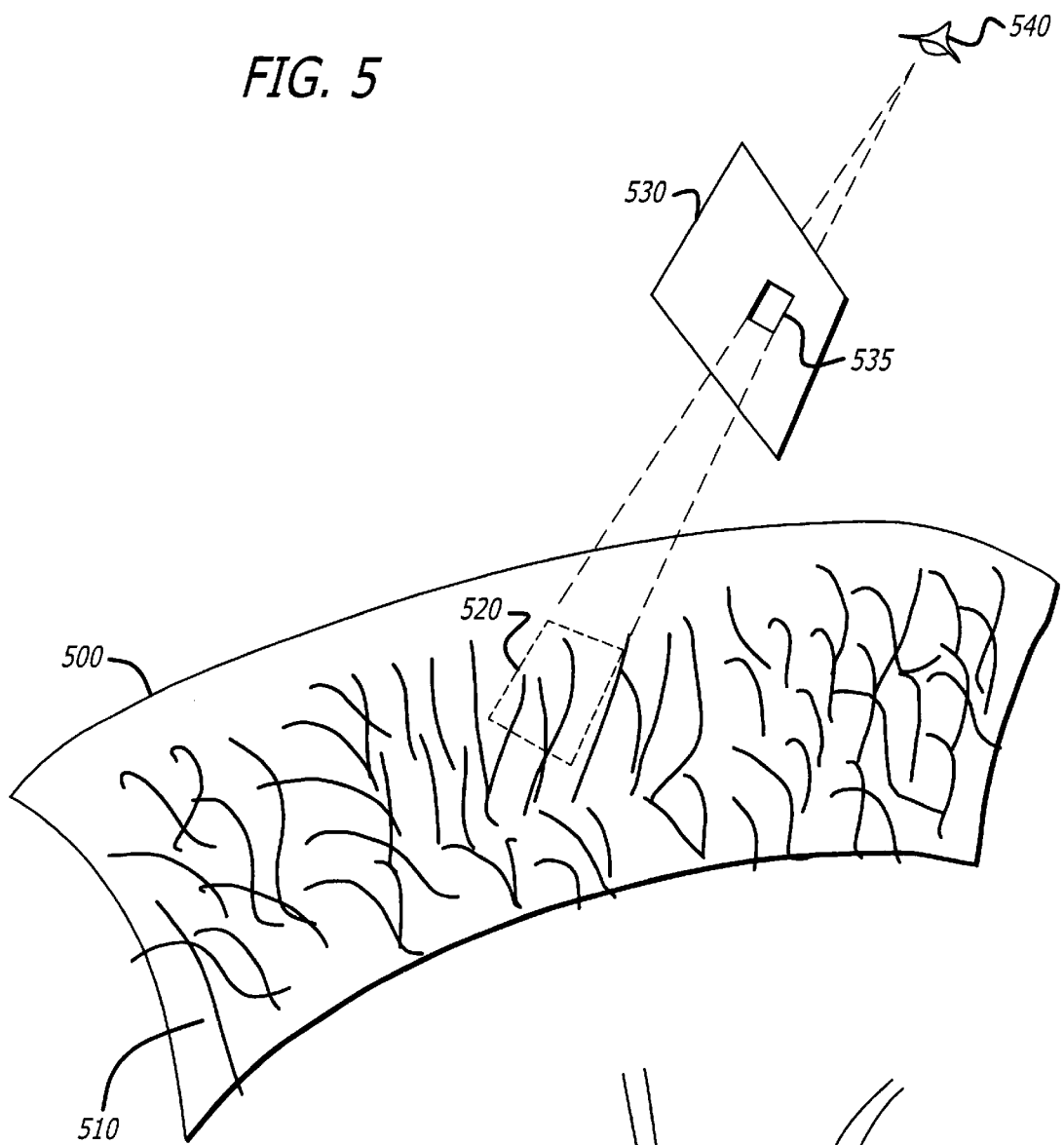
FIG. 5 is a perspective view of an area to be rendered.

FIG. 5 provides an overview of the rendering task that is performed at step 250 by rendering software 425. Basically, rendering entails projecting three-dimensional image information onto a two-dimensional surface from the perspective of a defined point of view. In FIG. 5, three-dimensional hairs such as hair 510 are attached to surface 500. FIG. 5 illustrates a two-dimensional projection of the hairs growing from region 520 onto pixel 535 within two-dimensional bitmap 530, from the point of view of eye or camera lens 540. The task of rendering is to perform such projections for the entire region of interest (such as all of surface 500), and to compute appropriate values for each corresponding pixel in bitmap 530, all from point of view 540. Rendering may be a particularly complex task for images of hair, because of the large number of individual hair objects (or portions of hair objects) which may occupy all or part of each individual pixel. Referring once again to FIG. 4, note that 3D scene data 400 is available to hair renderer 425, so that rendering software 425 will have access to information regarding the scene's light source, the point of view, and the shape of the skin or surface upon which the hair is located.

Rendering basically entails scan-converting or sampling of hair objects so as to generate raster data. In a preferred embodiment of the present invention, rendering is performed by rendering software 425 using the "curve rendering" technique, familiar to those of ordinary skill in the art. Using curve rendering, hairs can efficiently be modeled as one-dimensional (i.e., single-parameter) curves within three-dimensional space.

Preferably, curve rendering is augmented by rendering software 425 with an anti-aliasing technique, in order to eliminate undesirable aliasing effects. Thus, sampling a hair object does not simply generate a 1-bit "yes" or "no" for each pixel, but instead generates a relative measure of opacity that the sampled hair contributes to each pixel. In a simple model, opacity may be calculated as a measure of the approximate fraction of the pixel covered by the hair, if the hairs are modeled as very narrow tubes. Preferably, in a color system, opacity values also reflect the color and/or other hair parameters of each hair; for example, the opacity of a blonde hair which covers ten percent of a pixel may be modeled by a numeric value equal to ten percent of the value of a completely blonde pixel. In this way, it is possible to generate an overall opacity value for each pixel by summing together the opacity values contributed by each hair whose projection intersects the pixel.

Figure 6:
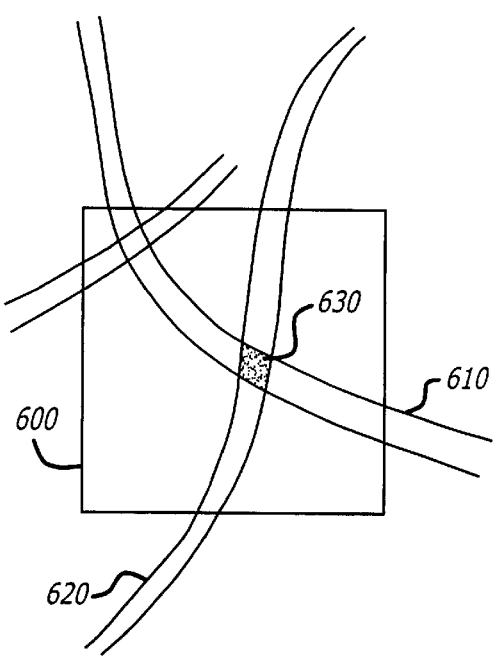
FIG. 6 is an illustration of hairs subject to an anti-aliasing technique for rendering hair in accordance with the present invention.

Complications may arise in applying the foregoing anti-aliasing technique, in the context of overlapping hairs. It is important to avoid double-counting overlapping opacity contributions. For example, FIG. 6 illustrates pixel 600 intersected by a plurality of overlapping hair objects. Thus, for example, darkened region 630 is crossed by hairs 610 and 620. One might therefore suppose that for purposes of the opacity calculation, the effective area of either hair 610 or 620 should be reduced by an amount corresponding to the area of region 630, in order to avoid double-counting when summing the opacity contribution of hairs 610 and 620. However, recall that in accordance with the present invention, individual hairs may differ from one another in terms of a variety of hair parameters such as color and light reflection. Therefore, it is not sufficient merely to detect overlaps such as region 630 and to subtract the opacity contribution of region 630 from the overall opacity sum for pixel 600. Rather, renderer 425 preferably determines which one of multiple overlapping hairs is uppermost and actually visible from the defined point of view, and computes an opacity contribution reflecting the visible hair's color and hair parameters.

Figure 7:
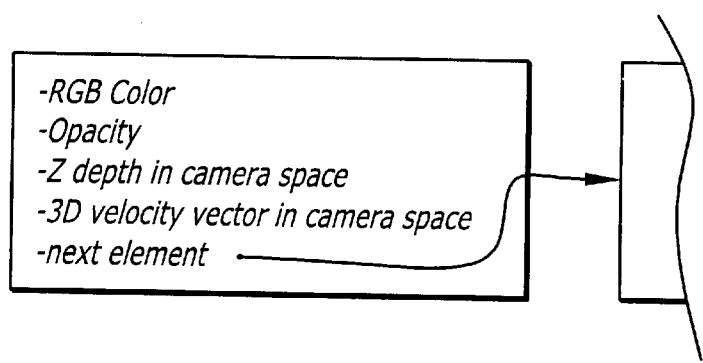
FIG. 7 is a block diagram of a preferred data structure for representing hair image information computed during the rendering process.

In order to successfully take three-dimensional visibility into account when computing the opacity contribution of each hair, a preferred embodiment of the present invention preserves three-dimensional information regarding the hairs projected onto each pixel. FIG. 7 illustrates a preferred data structure for representing pertinent hair image information for each pixel. As illustrated in FIG. 7, each pixel is represented by a linked list. Each list element corresponds to an individual hair intersecting the pixel. Each list elements includes the percentage of the overall pixel represented by that region, the color and other image parameter values of the hair, and depth and velocity information indicating the relative depth and motion of that hair in the scene from the perspective of the defined point of view.

Iterative Generating and Rendering of Hair

As noted earlier in connection with FIG. 2, hair generating step 240 and rendering step 250 preferably are performed in an iterative manner. In other words, using FIG. 3a as an example, during each iteration only a portion of surface 300 and control hairs 310a–n are processed as to hair generation. The portion of hair for which geometry has been generated is then rendered at step 250. As shown in FIG. 2 by decision point 255, this iterative process continues for additional portions of hair until all hairs in the scene have been processed and rendered.

This portion-by-portion, iterative technique enables the processing of a very large number of individual hairs to be accomplished with limited, finite computational resources. The amount of hair to be processed at each iteration depends on the computational resources available to a given practitioner.

Note that the preferred architecture of FIG. 4 is flexible enough to accommodate scenes comprising objects besides hair. Thus, 3D renderers 460 are preferably utilized to generate 3D element data 470 for scene objects besides hair. These other renderers 460 may be conventional, commercially available rendering packages, or may be custom designed for special kinds of scene objects and applications. This flexible architecture reflects the fact that scene elements other than hair may well not share the high-density and non-uniform properties of hair, and may therefore be dealt with more effectively and efficiently using other rendering techniques. Rendering information from 460 is sent to 425, to insure a better quality of non furry object's edges, as well as to avoid rendering hairs entirely hidden by a foreground opaque object. Note also in FIG. 4 that during the rendering process, renderers 425 and 460 preferably exchange shadow information 440 regarding the various objects they are rendering. This information exchange is conducted because in a three-dimensional scene, some objects may cause shadowing effects upon other objects, depending on the location of the various objects relative to the scene's light source. Such shadowing effects should be taken into account by the renderers.

Animation Sampling and Interpolation

Referring now to FIGS. 10a and 10B, a texture map such as map 90 may be used to control the density of rendered items such as hairs 88 over a given surface such as a creature's skin 92. A texture map such as map 90 may be used to create a much smaller set of "sample items" such as sample hairs 94, for use in a computer animation simulation.

Figure 11:
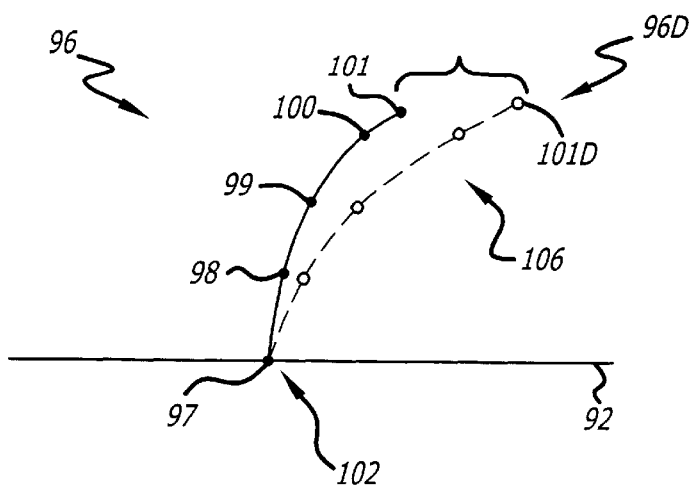
FIG. 11 is a side view of a control hair from FIG. 9B showing the control points.

Referring now to FIG. 11, each item such as hair 96 may consist of an ordered set of control points 97–101 used to define the shape of hair 96. Rest position of the sample items' control points may be stored in coordinates local to creature's skin 92 at item root 102. Simulated motion 96D of sample hairs such as sample hair 96 may then be simulated. Displacement 106 may be calculated as the distance between a simulated position such as position 101D and its rest position such as control point 101 on each sample hair.

Figure 14A:
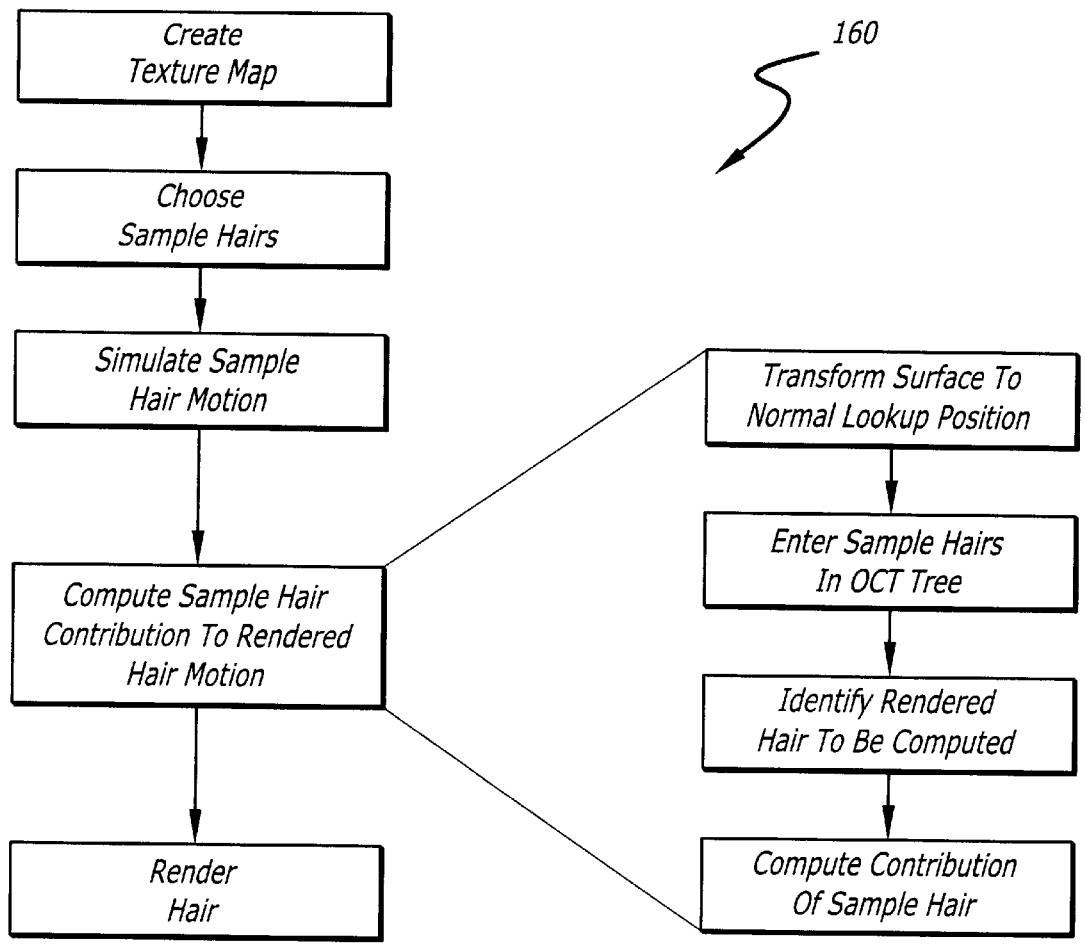
FIGS. 14A and 14B are a hair animation flow chart and a side view of a rendered hair to be animated.
Figure 14B:
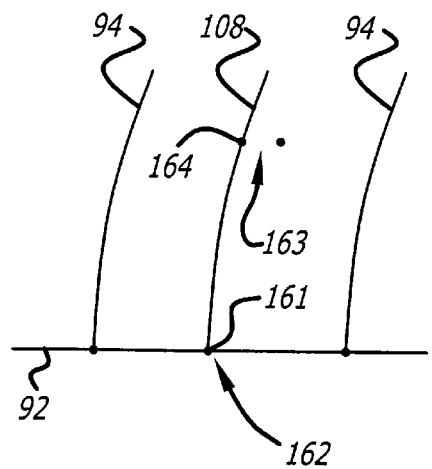

Referring now to FIGS. 14A and 14B, rendered hair generated according to the process of FIG. 2, may be subjected to dynamic simulation for animation. To apply dynamics to rendered hairs such as hair 108, a set of sample hairs such as sample hairs 94 nearby on surface 92 are computed according to process 160. A first control point 161 represents root 162 of the hair, and is not animated. A displacement 163 for each of the other control points such as control point 164 on a rendered hair such as hair 108 is computed, using the weighted average of the displacements for the corresponding control points in the sample hairs in the nearby set. The weighting function is based on the distance between the sample hair and the rendered hair. Any suitable curve that gives more weight to nearby sample hairs may be used. In a currently preferred embodiment of the present invention a sigmoid curve is used.

The set of nearby sample hairs is computed by a special technique. The creature's geometry is first transformed to a special "lookup" position, chosen to keep all creature surfaces well separated. In this position, all the sample hairs are entered into a suitable data structure such as an oct-tree or a k-d tree. The set of all sample hairs near a point on the creature's surface can then be computed by first transforming the rendered hair's position to the special lookup position, and then performing a conventional 3-D region query using the chosen data structure.

Although the above description is directed to hair, it may be applied to linear objects such as rope, antennae, feathers, fur, grasses or many other types of generally similar items.

Damping Dynamics of Linear Objects

Figure 12:
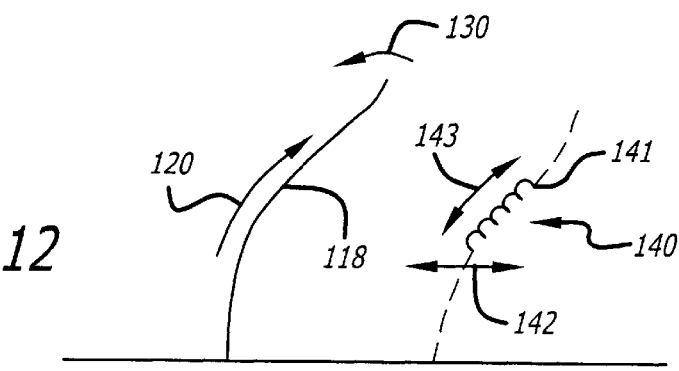
FIG. 12 is a side view of a rendered hair and its simulation model.

Referring now to FIG. 12, dynamic simulation according to the present invention is applied to a subset of linear items such as control hairs as discussed above. In a currently preferred embodiment of the present invention a damping formulation for linear objects such as hair 118 or rope, antennae, fur, grass, trees or any similar objects may be based on two terms, momentum distribution 120 and object body 130. Momentum distribution 120 may provide distribution of momentum along a linear object during a simulation integration and may be considered as similar to a traditional bending association. Object body 130 may be a drag term which may generally be small and may provide a velocity drag to the velocity of a non-simulated, enveloped, position of a linear object such as hair 118. The key factor of these two formulations is that when used together as in equation 122, they provide the appearance of object to object coupling without the significant computational expenses associated with true object to object coupling.

EQ 122→Damping D=Momentum distribution 120+Object Body 130

Formulation of Linear Object Restoring Forces

In a dynamic simulation of one or more linear objects according to the present invention two restoring forces, stretch 140 and stiffness 142 may be used to provide a more realistic simulation. Stretch 140 may be a spring based stretching force 141 t hat acts only in direction 143 of a linear object such as hair 118 and may be equivalent to tensile stiffness in a cloth simulation.

Figure 13:
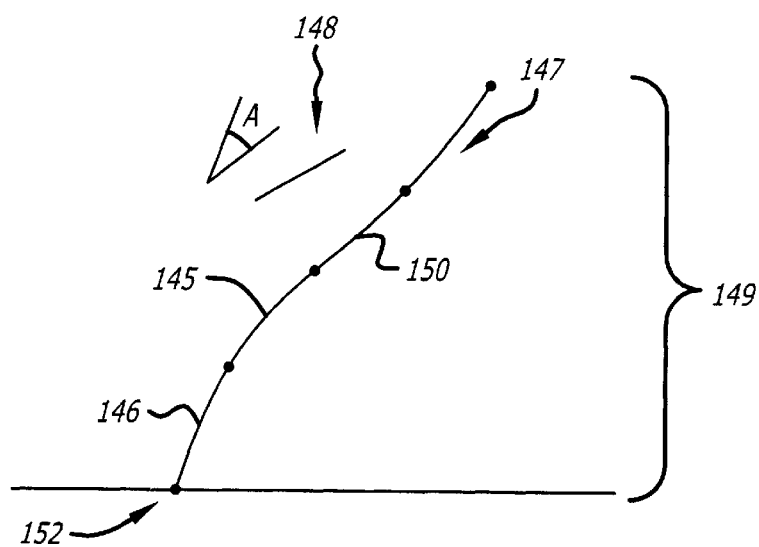
FIG. 13 is a side view of a rendered hair showing the control points.

Referring now to FIG. 13, stiffness 142 may be a target based stiffness which combines bending stiffness elements such as elements 145 and 146. The target position for a stiffness force such as force 147 may be determined by taking enveloped orientation 148 and length 149 of a segment of a linear object such as segment 150 and rotating it by an angle A needed to rotate the segment one closer to object root 152 from its enveloped orientation to its current orientation. This rotated segment is then used as a position vector starting from the current position of the base of the segment to provide an anchor position for a spring that combined bending and tensile stiffness.

When used together stretch 140 and stiffness 142 can achieve a wide range of physical properties. For example a stretchy, bouncy look can be achieved with a negative tensile stiffness offsetting a larger target stiffness, and limp, rope like behavior can be achieved with a large tensile stiffness and small target stiffness.

Compositing

Figure 8:
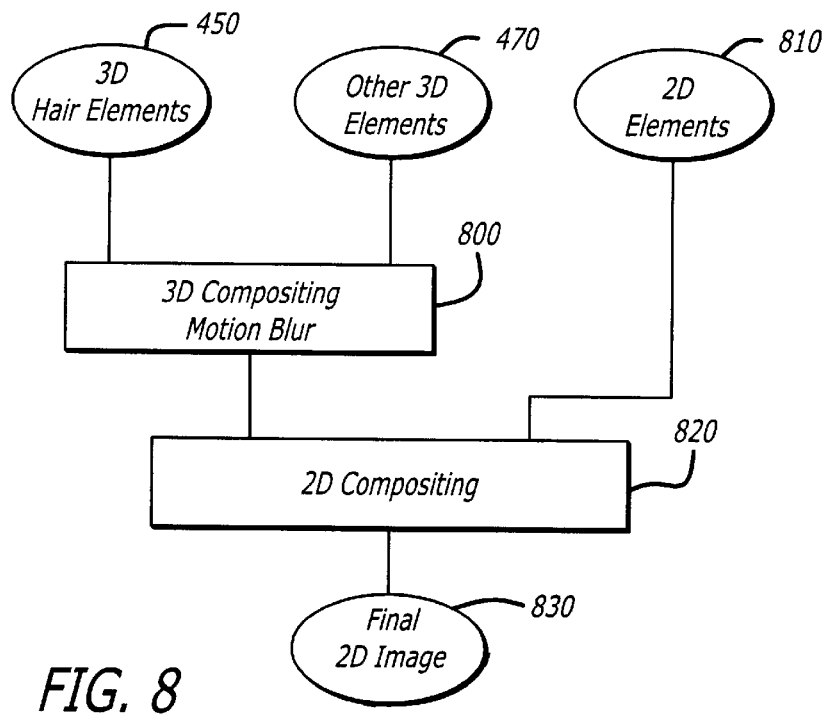
FIG. 8 is a block diagram representing further aspects of a preferred information flow in accordance with the present invention.

Referring again to FIG. 2 at step 260, fully rendered hair may be combined (or "composited") with other elements of a scene being represented. FIG. 8 shows a block diagram representing a preferred information flow for the compositing process, in accordance with the present invention. Once again, in this diagram, data inputs and outputs are generally depicted with circles, while processing steps or tasks or depicted with rectangles. As in FIG. 4, the output of rendering step 250 is depicted in FIG. 8 as hair data 450. Broadly speaking, and as shown in FIG. 8, hair data 450 is combined during the compositing process with data 470 regarding other three-dimensional scene elements, and with data 810 regarding various two-dimensional scene elements (such as background scenery, for example), ultimately yielding final two-dimensional image 830 which graphically depicts the original scene as viewed from the defined point of view.

Hair data 450 and data 470 include some amount of three-dimensional depth information in addition to the straightforward two-dimensional projection data produced by the rendering step, because such depth information allows these three-dimensional elements to be properly integrated during the compositing process. Such processing is depicted in FIG. 8 as three-dimensional compositing step 800. For example, if a hair is blocked by another scene object that lies closer to the camera, the blocked hair should not be visible in the generated image. Maintaining at least some depth information regarding hairs permits detection of situations where such blockage occurs. However, in the interests of computational efficiency, the amount of three-dimensional depth information that is maintained and utilized during compositing need not be as extensive and detailed as the depth information utilized during rendering.

For example, if a linked list such as illustrated in FIG. 7 is used to capture three-dimensional hair information during rendering, hair data 450 would preferably include only a subset of that information. One possible approach would be to rank the elements of a FIG. 7 linked list by the magnitude of each element's opacity contribution, and to discard all but the most significant contributors, i.e., all but some fixed number of list elements. Alternatively, all list elements with less than some predetermined threshold opacity contribution could be discarded. Only the remaining elements not discarded would then be maintained as hair data 450 for the compositing process at step 800. In same cases, this compositing step was even performed on a single element, the one which has the higher opacity in the list, with acceptable visual results.

The phenomenon of motion blurring provides a further example of how depth and velocity information may be utilized advantageously during the compositing process. Suppose that we wish to composite CG hair onto an animal moving within a three-dimensional scene, and that the moving animal has been filmed using a camera having an exposure rate illustrated by graph 950 of FIG. 9. In that illustration, the exposure rate is shown as t2–t1. Suppose further that motion blur is assumed to cause each pixel representing the animal to move roughly one pixel to the right during the exposure time for each frame. Stated differently, motion blur means that our digital image of the moving animal includes a copy of each pixel of the animal image superimposed onto its right-adjacent pixel. Photo-realism demands that the animal's hair exhibit a consistent degree of motion blur.

Therefore, in a preferred embodiment of the present invention, the CG hair is artificially "blurred" during composite step 800. Roughly speaking, for the example of FIG. 9, the opacity contribution made by each hair to each pixel should be added to the right adjacent pixel as well. Thus, in FIG. 9, the opacity contribution of hair 900 with respect to pixel 910 is applied to adjacent pixel 920 as well. Preferably, however, the technique is sill more refined, and takes advantage of the hair depth information referred to above. In particular, the motion blur computation during the three-dimensional compositing step considers the Z-coordinate depth and velocity of each hair relative to other objects in the scene, just as discussed above. If motion blurring would move a hair into a position in which the hair would no longer be visible because it would lie behind some other, obscuring object, then the opacity contribution for the hair in that new position is taken into account for the corresponding pixel.

Having now described the invention in accordance with the requirements of the patent statutes, those skilled in this art will understand how to make changes and modifications in the present invention to meet their specific requirements or conditions. Such changes and modifications may be made without departing from the scope and spirit of the invention as set forth in the following claims.

We claim:

1. A method of animating a plurality of linear items comprising the steps of:

selecting one or more control items from the plurality of linear items;

simulating motion of each control item;

simulating motion of the plurality of linear items according to a weighting function of the simulated motion of the control items, where the weighting function is a sigmoid curve; and rendering the plurality of linear items.

* * * * *